United States Patent

[11] 3,568,805

| [72] | Inventor | Wilmer H. Reed III<br>Hampton, Va. |
|---|---|---|
| [21] | Appl. No. | 794,968 |
| [22] | Filed | Jan. 29, 1969 |
| [45] | Patented | Mar. 9, 1971 |
| [73] | Assignee | The United States of America as represented by the Administrator of the National Aeronautics and Space Administration |

[54] SUSPENDED MASS IMPACT DAMPER
11 Claims, 6 Drawing Figs.

[52] U.S. Cl. .................................................. 188/1, 188/103
[51] Int. Cl. .................................................. F16f 7/10
[50] Field of Search ........................................ 188/1 (B), 103

[56] References Cited
UNITED STATES PATENTS

| 2,195,041 | 3/1940 | Von Schlippe ............... | 188/1(B)X |
| 3,259,212 | 7/1966 | Nishioka et al. ............. | 188/1(B) |

Primary Examiner—Duane A. Reger
Attorneys—Howard J. Osborn, John R. Benefiel and G. T. McCoy ABSTRACT: This disclosure concerns a damper mechanism for tall and towerlike structures, such as smokestacks and antennas, etc., and comprises a suspended mass such as a chain confined in an enclosure fastened to the primary structure. Vibrations of the primary structure produce opposing movements of the mass and resulting impacts of the mass with the enclosure sides in turn produce a damping force on the primary structure.

PATENTED MAR 9 1971

INVENTOR.
WILMER H. REED, III
BY
ATTORNEYS

SUSPENDED MASS IMPACT DAMPER

ORIGIN OF THE INVENTION

The invention described herein was made by an employee of the United States Government and many may be manufactured and used by or for the Government of the United States of America for governmental purposes without the payment of any royalties thereon or therefor.

This invention concerns a damping mechanism particularly suited to reduce wind-induced oscillations of tall towerlike structures, such as smokestacks, antennas and vehicular launch mechanisms.

In the past, damping devices most frequently used for this purpose operated on the principle of viscous or solid friction-type damping. The performance of these devices was very much dependent on the frictional coefficient, break-out force, and on the viscosity of the damping fluid. Since these parameters may change significantly with age of the damper system, and are often sensitive to temperature, moisture or environmental factors, periodic maintenance is required to assure that the damper performs as intended. In addition, these devices are relatively complex, expensive and less reliable than is desirable.

Another method of damping such structures involves filling the structure with a loose aggregate, such as sand or gravel. Although ideally suited for certain applications, this approach can have severe drawbacks when weight and structural functions are a consideration. Another solution to the problem of wind induced oscillations is the more conventional guy wire support. These external connections are relatively expensive, difficult to install and require a great deal of space about the location of the structure.

Therefore, it is an object of the present invention to provide a damping device which does not require maintenance to insure proper performance.

It is another object to provide a damping device which is simple and inexpensive to construct, while providing effective performance.

It is yet another object to provide a damper device which does not require external connections or guy wires.

It is also an object of this invention to provide a damping device with response characteristics which can be accurately predicted by design calculations.

It is still another object to provide a damping device which effectively of the present invention to provide a damper device which is insensitive to changes in environment.

It is yet another object to provide a damping device which effectively attenuates oscillations in every direction.

These and other objects are accomplished by the use of a suspended mass impact damper taking the form of a suspended chain enclosed in structure affixed to the primary structure, and producing damping impacts in response to oscillation of the primary structure.

Figure 1:
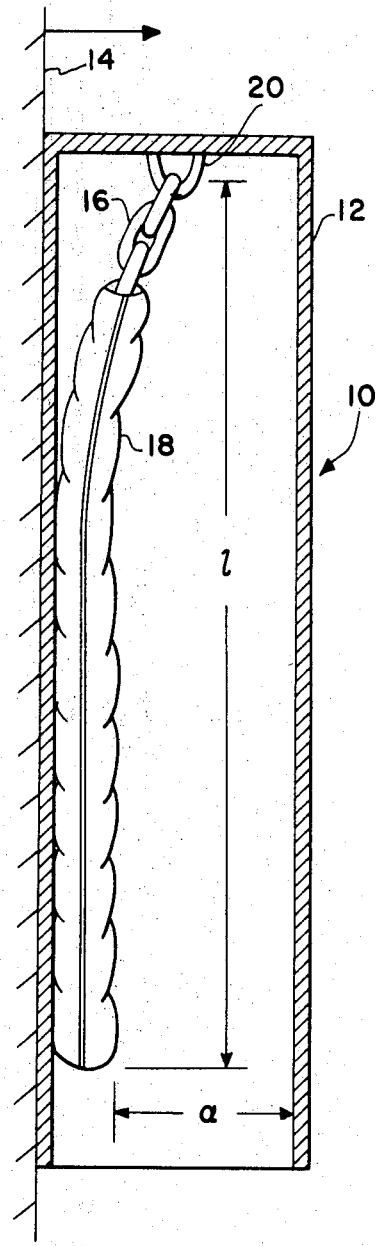
FIG. 1 is a front elevation view of the basic configuration of the invention.

Referring now to the drawings and in particular FIG. 1, the damper mechanism is indicated generally as 10. An enclosure 12 is fastened to the primary structure 14 which is subjected to the undesirable oscillations. Suspended within the enclosure 12 is a chain 16 which is covered with a length of rubber tubing 18. This chain 16 is allowed to swing freely by means of pivot 20 secured to the top portion of enclosure 12. As the primary structure 14 oscillates, a counter movement of the pendulum chain 16 occurs, resulting in an impact along the wall of the enclosure on the side opposite the direction of motion of the primary structure, indicated by the arrow in FIG. 1. Movements in the opposite direction produce similar impacts with the other wall. These opposing impacts result in attenuation of oscillations of the primary structure 14. The enclosure 12 is cylindrical so as to respond to oscillations in any direction.

From experimental and theoretical studies which have been made, it can be shown that the energy dissipated by a hanging chain impact damper depends primarily upon the following parameters: length and weight of the chain; clearance gap distance; frequency and amplitude of imposed vibration; and the coefficient of restitution between the chain and the container. A general conclusion that may be drawn is that performance of hanging chain impact dampers can be predicted with accuracy suitable for design purposes.

It should no noted that while the particular form of suspended mass disclosed has been that of a length of chain, other forms such as lengths of flexible cable or simply a pendulum bob could be used. However, the chain configuration is particularly advantageous because it provides a fairly massive pendulum element while at the same time yielding a rather large contact area at impact as seen in FIG. 1, thus reducing design requirements for hardness and strength of the enclosure 12.

From the studies referred to above, it can be shown that for a given vibration amplitude, damping increases approximately linearly with the clearance gap until the gap exceeds a critical value beyond which impacts no longer occur and consequently the damping suddenly drops. This critical gas distance is found to be in the neighborhood of five times the displacement amplitude of the vibrating container.

In addition, to achieve efficient damper performance, the chain length should be such that the structural frequencies of concern are at least twice the natural fundamental frequency of the hanging chain. An approximate expression for this relationship is $$l = \frac{4}{f^2}$$

where $l$ is the chain length in feet and $f$ is the structural frequency in cycles per second. Of course, if variations in the specific suspended mass configuration are made, this expression would vary, but could easily by arrived at by the application of well-known principle of mechanics.

It is also noted that a chain damper mounted on a mass-spring oscillator system produces, for best operating conditions, damping equivalent to a viscous damping ratio of $$(c./c._0.)_{\text{equiv}} = \frac{\mu}{1+\mu},$$

where $\mu$ is the ratio of the chain mass to that of the system without damper, $c$ the equivalent viscous damping coefficient, and $c_c$ the critical damping coefficient.

Figure 3:
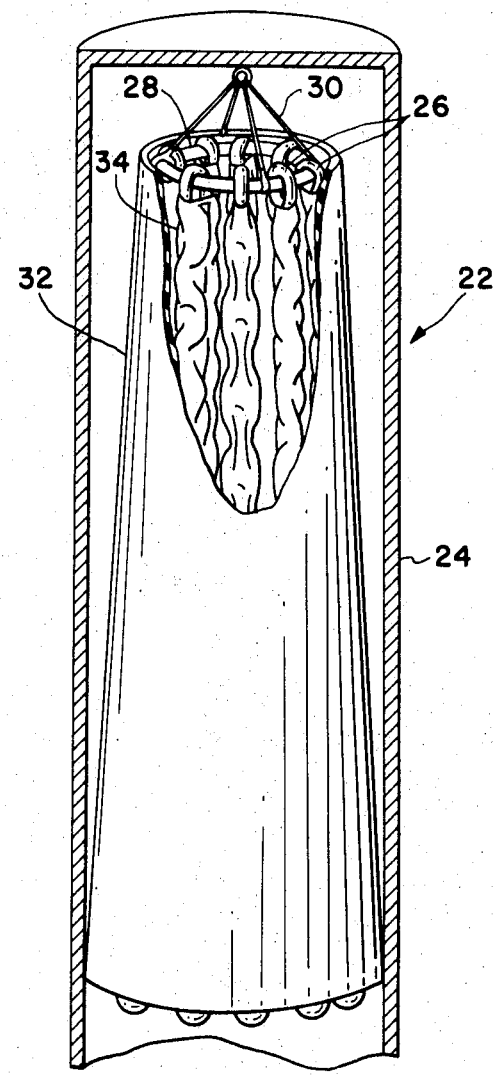
FIG. 3 is a partial cross-sectional view of the section taken along line 3–3 of FIG. 2.
Figure 2:
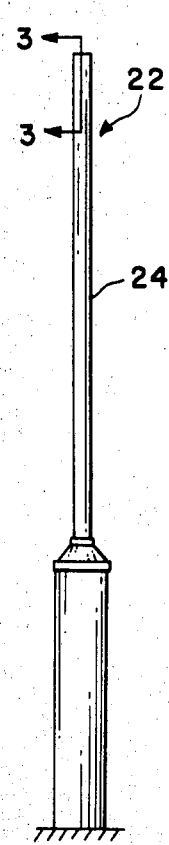
FIG. 2 is a front elevation view of the exterior or a typical tower structure.
Figure 4:
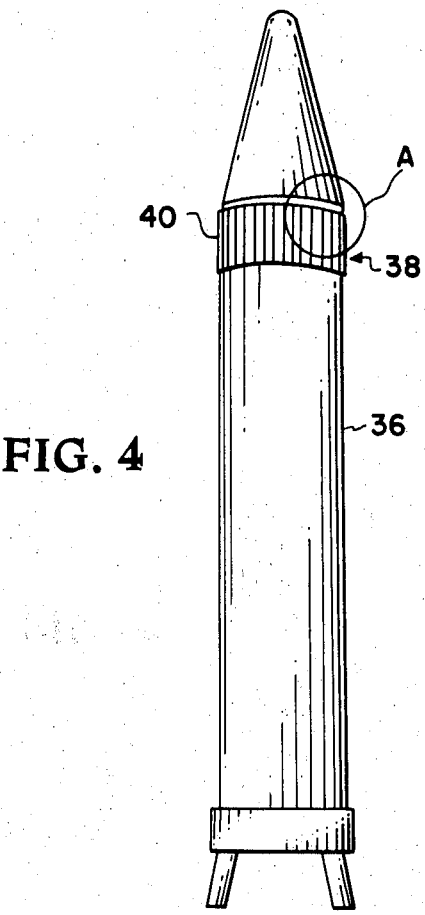
FIG. 4 is a front elevation view of a launch vehicle incorporating the principle of the invention.

In FIGS. 2 and 3 a practical application of this damping device is illustrated. Wind-excited oscillations of high-band antenna elements have been shown to cause damage to various elements of such antenna. These oscillations have been observed over a range of wind speeds including relatively light winds. In FIG. 2 the damper mechanism 22 is contained in top portion of antenna mast 22 is contained in top portion of antenna 24. In this particular embodiment, a group of chains 26 are each suspended on a ring 28 which is in turn suspended by means of cables 30 to the tip portion of the mast 24. A conical neoprene shroud 32 and plastic coverings 34 on the chain members serve to protect the aluminum mast section 24 from impact damage and also to muffle the noise due to impacts.

Wind tunnel test of a full scale antenna of this type has verified the effectiveness of this damper configuration and significant reductions in vibration response are produced. For example, in a typical installation the vibration amplitude at wind speeds up to 60 knots were less than the amplitude of the response peak at wind speeds of 5 knots for the unmodified antenna.

It is noted that in this design oscillations in any direction are effectively damped.

Figure 5:
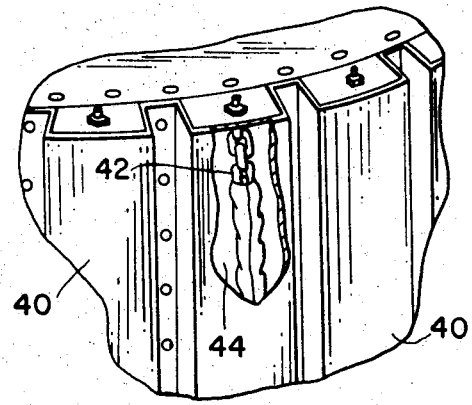
FIG. 5 is a detailed view of the area shown in the circle A.

Views 4 and 5 show another application of the pendulous impact damper. In this application, a rocket launch vehicle 36 is attempted to be protected from wind-induced oscillations. In this installation, a number of chain members are placed about the periphery of the upper portion of the launch vehicle body at 38. This installation shown in detail in FIG. 5 shows a corrugated belt section 40 installed about the upper portion of the vehicle. A chain member or groups of chains 42 are supported suspended into the openings formed by the channels 44 in the corrugated belt member 40 and produce the opposing impacts in response to wind-induced oscillations in like manner as the other configurations described. This application similarly produces damping of wind-induced oscillations in any direction.

Figure 6:
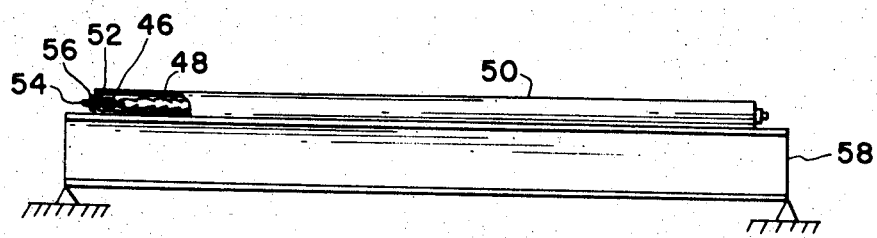
FIG. 6 is a side elevation in partial section of another form of the invention.

FIG. 6 shows another form of the suspended mass damper which would be particularly suited for horizontally disposed members subject to vibrations in a vertical direction. In this configuration a chain member 46, covered with rubber tubing 48, is suspended in an enclosure 50 by means of a tension support at each end consisting of a pivot 52 which has an attached threaded bolt portion 54 passing through the end walls of the enclosure 50. A tension nut 56 is then used to tension the chain. The enclosure 50 is attached to the primary structure 58.

In this configuration, it is noted that an additional parameter for performance and natural frequency of the damper has been introduced, i.e., the tension applied to the chain.

In summary, the suspended mass impact damper and particularly the hanging chain impact damper as described herein has been shown to offer numerous advantages over most existing methods of damping this type of structure. The damper is extremely simple and thus low in cost to fabricate and install. The performance is predictable from a design standpoint, and is insensitive to changes in environment. The device is also maintenance-free, and usually would outlast the primary structure into which it is incorporated. In the primary addition, no guy wires or external connections are necessary while omnidirectional damping is achieved. While the suspended mass impact damper has been shown in the specification to take the form of a hanging or tensioned chain impact damper and particular installations are shown, it is understood that the invention is not to be limited to the particular chain damper nor to the particular installations disclosed, but may be practiced in a variety of other forms.

I claim:

1. A suspended mass impact damper for damping oscillations in a primary structure comprising:
    a damper mass member consisting of a flexible length of material;
    an enclosure fixed to said primary structure having at least two opposed surfaces juxtaposed with said damper mass member therebetween, support means connected to said primary structure;
    means pivotally supporting said damper mass member so as to allow undulating pendulous movement of said damper mass member whereby said damper mass member whereby said damper mass member moves into and impacts said enclosure and damps oscillations of said primary structure by opposing movements and impacts.

2. The damper of claim 1 wherein said damper mass member consists of a length of segmented material.

3. A suspended mass impact damper for damping oscillations in a primary structure comprising:
    a damper mass member consisting of a chain;
    an enclosure fixed to said primary structure having at least two opposed surfaces juxtaposed with said damper mass member therebetween, support means connected to said primary structure;
    means pivotally supporting said damper mass member so as to allow said damper mass member to move into and impact said enclosure, whereby oscillations of said primary structure are damped by opposing movements and impacts of said damper mass member.

4. The damper of claim 1 wherein said enclosure completely surrounds said damper mass member and said support means allows undulating pendulous movement in all directions, whereby damping in all directions is provided.

5. The damper of claim 3 further including a resilient covering on said length of chain, whereby impact noise and damage to said enclosure are minimized.

6. A suspended mass impact damper for damping oscillations in a primary structure comprising:
    a damper mass member consisting of a flexible length of material;
    an enclosure fixed to said primary structure having at least two opposed surfaces juxtaposed with said damper mass member therebetween, support means connected to said primary structure;
    means securing said damper mass member at both ends so as to tension said member and to allow said member to move into and impact said enclosure, whereby oscillations of said primary structure are damped by opposing movements and impacts of said damper mass member.

7. A suspended mass impact damper system for damping oscillations in a primary structure comprising:
    a plurality of enclosures disposed about and fixed to said primary structure, each having at least two opposed surfaces;
    a plurality of damper mass members consisting of flexible lengths of material disposed with at least one member in each enclosure;
    support means connected to said primary structure pivotally supporting each of said damper mass members so as to allow undulating pendulous impaction of each of said mass members against said opposing surfaces of an enclosure.

8. The damper system of claim 7 wherein said damper mass members each consist of a length of segmented material.

9. A suspended mass impact damper system for damping oscillations in a primary structure comprising:
    a plurality of enclosures disposed about and fixed to said primary structure, each having at least two opposed surfaces;
    a plurality of damper mass members consisting of lengths of flexible material disposed with at least one member in each enclosure;
    support means connected to said primary structure and securing said ends of said flexible mass member so as to tension said member while allowing movement of said member into said opposing surface of an enclosure.

10. A method of damping specific vibrations of a primary structure comprising:
    supporting a flexible length of material from a point connected to said primary structure;
    allowing free undulating pendulous movement in the direction of the vibrations;
    fixing opposing surfaces to the primary structure disposed with the material therebetween and free to impact said surfaces and spaced with a clearance less than approximately five times the amplitude of the primary structure vibrations to be damped.

11. A method of damping specific vibrations in a primary structure comprising:
    fixing a member to the primary structure, said member having at least two opposed surfaces;
    suspending a flexible length of material between said surfaces so as to allow contact therewith as a result of undulating pendulous movement from at least one point fixed to said primary structure and in such a manner as to have a natural fundamental pendulum frequency at least twice that of the specific vibrations to be damped.